United States Patent
Leers et al.

(10) Patent No.: US 11,940,213 B2
(45) Date of Patent: Mar. 26, 2024

(54) THERMODYNAMICALLY REGULATED METHOD AND THERMODYNAMICALLY REGULATED DRYING SYSTEM FOR DRYING GOODS TO BE DRIED

(71) Applicant: WENKER GMBH & CO. KG, Ahaus (DE)

(72) Inventors: Franz Leers, Ahaus (DE); Fokko Johann Crone, Rhauderfehn (DE); Andreas Schaake, Dresden (DE)

(73) Assignee: WENKER GMBH & CO. KG, Ahaus (DE)

( * ) Notice: Subject to any disclaimer, the term of this patent is extended or adjusted under 35 U.S.C. 154(b) by 691 days.

(21) Appl. No.: 17/261,021

(22) PCT Filed: Jul. 10, 2019

(86) PCT No.: PCT/EP2019/000207
§ 371 (c)(1),
(2) Date: Jan. 17, 2021

(87) PCT Pub. No.: WO2020/015846
PCT Pub. Date: Jan. 23, 2020

(65) Prior Publication Data
US 2021/0293482 A1    Sep. 23, 2021

(30) Foreign Application Priority Data
Jul. 16, 2018   (DE) .................... 10 2018 005 578.8

(51) Int. Cl.
*F26B 21/10*    (2006.01)
*F26B 15/12*    (2006.01)
(Continued)

(52) U.S. Cl.
CPC .............. *F26B 21/10* (2013.01); *F26B 21/12* (2013.01); *F26B 23/002* (2013.01); *F26B 15/12* (2013.01)

(58) Field of Classification Search
CPC ........ F26B 21/00; F26B 21/12; F26B 23/002; F26B 15/12
(Continued)

(56) References Cited

U.S. PATENT DOCUMENTS 1,651,636 A * 12/1927 Shaughnessy ............ F23G 5/00
                                                    110/118
2,129,634 A *  9/1938 Albright .................... F27B 9/08
                                                    432/68
(Continued)

FOREIGN PATENT DOCUMENTS

DE    102008034746 B4      7/2011
DE    102018005578 A1 *   1/2020    .............. F26B 15/12
(Continued)

OTHER PUBLICATIONS

International Search Report for PCT App. No. PCT/EP2019/000207 Filed on Jul. 10, 2019 on behalf of Wenker GmbH & Co. KG, dated Sep. 9, 2019. 3 Pages.
(Continued)

*Primary Examiner* — Stephen M Gravini
(74) *Attorney, Agent, or Firm* — Steinfl + Bruno LLP

(57) ABSTRACT

The invention relates to a drying system (T) according to FIG. 1 for drying goods to be dried (LTG), comprising—a drying tunnel (TT), —a line (LAG) for exhaust gas (AG) containing (VOC) out of the drying tunnel (TT), —a controlled fan (GBL) for further transporting the exhaust gas (AG) to a heat exchanger (WT), —a heat exchanger (WT) for heating the exhaust gas (AG) using the clean gas (RG), —an exhaust gas line (LAG) downstream of the heat
(Continued)

Figure 1:
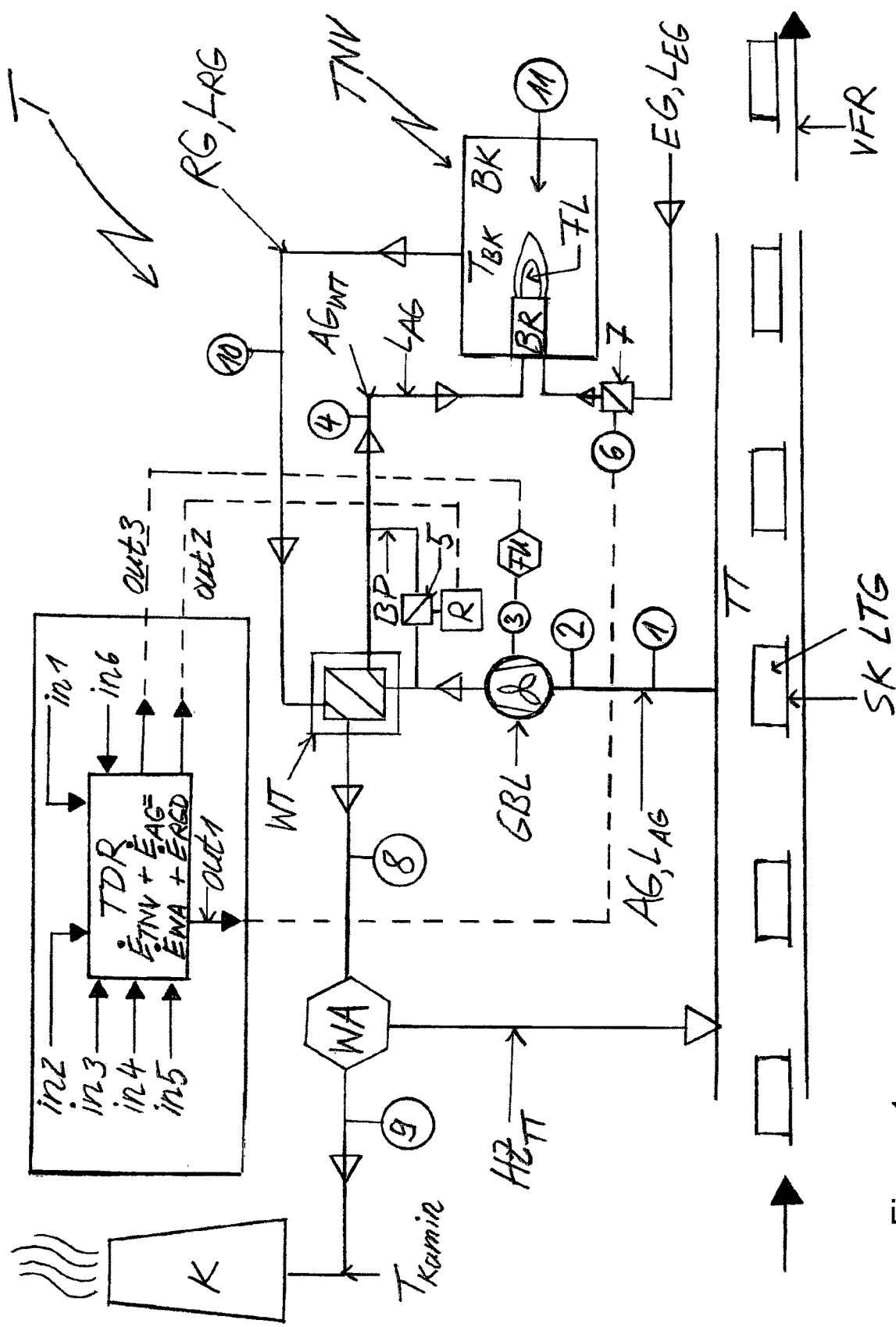

exchanger (WT) for further transporting the exhaust gas (AGWT) to a burner (BR) in a combustion chamber (BK) of a thermal post-combustion system (TNV), —a cold bypass (BP) which bypasses the heat exchanger (WT) and which can be regulated using an electronically controlled controller (R), —a fuel line (LEG) for a fuel (EG) to the burner (BER), —a clean gas line (LRG) for transporting the clean gas (RG) out of the combustion chamber (BK) to the heat exchanger (WT) in order to cool the exhaust gas (AG), —a clean gas line (LRG) for conducting the clean gas (RG) from the heat exchanger (WT) to the heat consumers (WA), —a heater (HZTT) for heating the drying zone (TT) by means of the heat consumers (WA), and —a clean gas line (LRG) for conducting the clean gas (RGD) to a stack (K). The invention also relates to a drying method and a method for a thermodynamic regulation (TDR).

14 Claims, 3 Drawing Sheets

(51) Int. Cl.
  *F26B 21/12* (2006.01)
  *F26B 23/00* (2006.01)
(58) Field of Classification Search
  USPC .......................................................... 34/524
  See application file for complete search history.

(56)         References Cited

U.S. PATENT DOCUMENTS

| | | | |
|---|---|---|---|
| 3,936,951 A | 2/1976 | Haueise et al. | |
| 4,255,132 A | 3/1981 | Carthew et al. | |
| 4,597,735 A * | 7/1986 | Deline | F27D 99/0075 126/91 A |
| 4,771,707 A | 9/1988 | Robson et al. | |
| 5,174,044 A | 12/1992 | Jacobs et al. | |
| 5,333,395 A * | 8/1994 | Bulcsu | F26B 13/005 34/79 |
| 5,528,839 A * | 6/1996 | Seidl | F26B 21/02 34/364 |
| RE36,728 E * | 6/2000 | Ishii | F26B 21/04 34/396 |
| 6,293,121 B1 * | 9/2001 | Labrador | F03D 5/00 62/304 |
| 7,984,566 B2 * | 7/2011 | Staples | F26B 23/001 431/12 |
| 8,464,437 B1 * | 6/2013 | Weisselberg | F26B 17/003 34/384 |
| 8,726,532 B2 * | 5/2014 | Hogan | F26B 17/104 15/345 |
| 11,684,891 B2 * | 6/2023 | Bergh | B01D 53/0446 34/398 |
| 2021/0293482 A1 * | 9/2021 | Leers | F26B 23/002 |

FOREIGN PATENT DOCUMENTS

| | | |
|---|---|---|
| EP | 0489962 A1 | 6/1992 |
| EP | 2422153 A2 | 2/2012 |
| EP | 2952843 A1 | 12/2015 |
| EP | 2295909 B1 | 2/2016 |
| WO | WO-2020015846 A1 * | 1/2020 .............. F26B 15/12 |

OTHER PUBLICATIONS

Written Opinion for PCT App. No. PCT/EP2019/000207 Filed on Jul. 10, 2019 on behalf of Wenker GmbH & Co. KG, dated Sep. 9, 2019. 6 Pages.

* cited by examiner

THERMODYNAMICALLY REGULATED METHOD AND THERMODYNAMICALLY REGULATED DRYING SYSTEM FOR DRYING GOODS TO BE DRIED

CROSS-REFERENCE TO RELATED APPLICATIONS

The present application is the U.S. National Stage of International Patent Application No. PCT/EP2019/000207 filed on Jul. 10, 2019 which, in turn, claims priority to German Patent Application No. 10 2018 005 578.8 filed on Jul. 16, 2018.

The present invention relates to a thermodynamically controlled process for the drying of drying goods.

Furthermore, the present invention relates to a process for the thermodynamic control of a drying plant for the drying of drying goods as well as to the control of the respective drying process.

Additionally, the present invention relates to a thermodynamically controlled drying plant for the drying of drying goods.

BACKGROUND OF THE INVENTION

A process for the drying of coated drying goods in a dryer is known from the German patent DE 10 2008 034 746 B4, paragraphs [0008] and [0009], during which process the hot clean gas exiting the thermal post-combustion chamber is led through a clean gas pipe through the dryer and a first circulation gas recuperator for the purpose of heating the circulating gas, thereafter, is led in a further the clean gas pipe through the dryer and then is led through at least one second circulating gas recuperator and, at last, is led to a fresh air recuperator for the heating of the fresh air, which is fed into the dryer in the inlet and outlet region of the drying goods. In doing so, the fresh air is led through a ring gap enclosed between the outer shell and the outer housing of the thermal post-combustion chamber before entering the fresh air recuperator.

The piping of the clean gas pipe through the dryer section by section and the thermal radiation resulting therefrom contribute substantially to the heating. With this kind of drying plants for car bodies the clean gas pipe behind the post-combustion chamber has a length of about 100 m. The clean gas has a temperature level of about 400° C. upon the exit out of the post-combustion chamber. This temperature is now lowered by the heat dissipation section by section in the dryer and in the recuperators thus far that the temperature after the fresh air recuperator is about 180° C. At the same time, the clean gas in the usage area of the dryer significantly exceeds the temperature level of the dryer so that it can be used for heating the dryer. In the case that the clean gas pipe sections in the dryer are configured as broad channels and are arranged below the car body conveyor, the quality of the drying of the floor assemblies which requires a lot of thermal energy is improved. Furthermore, in this process, the fresh air is led through the ring gap enclosed between the outer shell and the outer housing of the thermal post-combustion chamber before entering the fresh air recuperator. Thereby, the heated fresh air which is heated therein only requires a small additional heating for which the clean gas temperature present at the end of the clean gas pipe suffices.

The figure of the German patent DE 10 2008 034 746 B4 shows an embodiment of the dryer.

A process for the efficient use of the hot air streams in a car body coating facility is known from the European patent EP 2 295 909 B1, paragraphs [0005] and [0006], wherein the exhaust air from the dryer is led over an exhaust air ventilator unit of a thermal post-combustion chamber and is heated therein and is led by way of the clean gas pipe as clean gas through circulating gas recuperators and at least one fresh air recuperator, wherein the circulating air taken from the dryer and the fresh air are heated. In doing so, the fresh air taken from the fresh air recuperator is mixed with the circulating air taken from the dryer, and the resulting circulating air-fresh air mixture is heated in the circulating air recuperators and is again supplied to the dryer. In doing so, the quantitative air balance in the dryer is adjusted once and then locked.

This way, the fresh air reaches in the circulating air-fresh air mixture directly the heating zone and the stopping zone of the dryer. Therefore, the temperature level of the fresh air needs not be on the same temperature level of the dryer, but can be significantly lower because the circulating air recuperators raise the proportion of the fresh air in the circulating air-fresh air mixture to the temperature level of the dryer. This way, it is achieved that the clean gas temperature upstream of the fresh air recuperator can be far lower than the temperature of the dryer.

The figure of the European patent EP 2 295 909 B1 shows an embodiment of the dryer.

It is essential for the known processes and facilities that temperature of the thermal post-combustion facility is always held constant because the exhaust temperature of the thermal post-combustion facility always shows an unsteady behavior upon the controlling of the volume flow and, therefore, is not deemed controllable.

It is an object of the present invention to provide a process and a facility or plant which has additional technical possibilities for the control of drying plants or dryers and leads to further energy savings.

Accordingly, the object was solved by the drying plant of the invention for drying goods in accordance with the disclosure and drawings and the drying process of the invention according to the disclosure and drawings. The disclosure and drawings include advantageous embodiments of the drying plant and the process of the invention.

In the context of the present invention, the term "variable" means that the respective temperatures and volume flows are or will be adjusted continuously to the respectively desired necessary process conditions during the performance of the of the drying process of the invention and of the thermodynamic regulatory procedure of the invention.

The drying plant of the invention is essentially built up from corrosion resistant and heat stable materials, preferably from metals, and in particular from stainless steel. In the case of parts of the drying plant which are less thermally stressed or not stressed at all, other materials like plastics, glasses or wood are used. In particular, thermally stable plastics like thermoplastics and thermoset plastics which can be reinforced with glass fibers, steel fibers, basalt fibers, carbon fibers, textile fibers, and mats of steel or glass can be used. Moreover, the plastics can contain fire retardants. Examples of thermally stable thermoplastics are polyamides, polyimides, polyamideimides, polysulfones, polyethersulfones, polyetherketones and polyetheretherketones.

The drying plant of the invention comprises at least one, preferably one, drying tunnel through which the drying goods are conveyed in the conveying direction. Preferably, the drying goods of formed objects which are particularly preferably built up from wood, plastics, glasses, metals, fabrics and composites of at least two of these materials.

The drying goods can be objects of all kind. Examples for drying goods are formed plastic parts, which are partly dissolved and/or melted that their surface, glued composites of all kind, the adhesive layers of which are not yet dried, and coated formed objects of all kind which have been coated by spray coating, powder coating, curtain coating, electrodeposition coating and doctor blade coating, and formed objects which have been printed or painted by sieve printing, intaglio printing, offset printing, relief printing and flexographic printing.

Examples of suitable objects are building parts for architectural purposes like window frames, grids, railings, doors, stairs, rod assemblies, tubes, and mobile buildings, building parts and chassis of means of locomotion such as automobiles, trucks, buses, building machines, motorcycles, mopeds, quads, scooters, pedal-scooters, hoover boards, skateboards, longboards, two-wheel wind runners, locomotives, train wagons, airplane parts, hulls, high-quality household appliances, heating elements, radiators and building parts for sanitary purposes. In particular, the involve building parts and car bodies of automobiles, trucks and buses.

The drying goods are conveyed through the at least one, in particular, one drying tunnel on skids.

Furthermore, the drying plant of the invention comprises at least one, in particular one pipe for volatile organic compounds (VOC) containing exhaust gases from the at least one, in particular one, drying tunnel. The at least one exhaust gas pipe leads to at least one, in particular one blower which is controlled by at least one, in particular one frequency converter and transports in a controlled manner the exhaust gas through another exhaust gas pipe to at least one, in particular one heat exchanger, wherein the exhaust gas is variably heated by the clean gas channeled out of an at least one, in particular, one thermal post-combustion facility with at least one additional, in particular one additional clean gas pipe.

The exhaust gas heated to varying temperatures accepts the at least one, in particular, one heat exchanger in varying amounts through at least one, in particular one additional exhaust pipe and enters into at least one, in particular one burner of the at least one, in particular one thermal post-combustion facility.

Fuel is fed into the at least one, in particular one burner through at least one, in particular one fuel pipe in varying amounts. Gases like hydrogen, methane, propane, butane, or mixtures from at least two of these flammable gases, as well as liquid fuels like heating oil, kerosene, gasoline, diesel oil, as well as mixtures of at least two of these liquid fuels come into consideration as fuel. In particular, natural gas is used.

The resulting gas mixture of varying composition is burned in the at least one, in particular one combustion chamber in at least one flame, preferably, however, in at least at least two or more flames. This way, clean gas of varying composition and varying temperature results in the at least one, in particular one combustion chamber of the at least one, in particular one thermodynamic post-combustion facility subject to the composition of the gas mixture and its temperature, which temperature is mainly determined by the temperature of the heated exhaust gas.

For example, thermal post-combustion facilities as described in the German patent DE 10 2008 034 746 B4, paragraph [0018] can be used. Compact thermal post-combustion facilities, wherein the heat exchangers and the combustion chambers are forming one unit come into question. Compact thermal post-combustion facilities of this type are available from the company Wenker GmbH & Co. KG, Ahaus, Germany.

The drying plant of the invention comprises furthermore at least one, in particular one cold bypass which circumvents the at least one, in particular one heat exchanger by connecting the at least one, in particular one exhaust gas pipe before the at least one, in particular one heat exchanger with an at least one, in particular, one exhaust gas pipe downstream of the at least one, in particular one heat exchanger. The exhaust gas stream through the at least one, in particular one cold bypass is controlled by at least one, in particular one pilot valve. The inlet temperature of the exhaust gas before the entry into the combustion chamber is regulated by the cold bypass. The temperature in the combustion chamber is controlled by the pilot valve for the fuel.

The clean gas originating in the at least one, in particular, one combustion chamber is fed through at least one, in particular one clean gas pipe to the at least one, in particular, one heat exchanger, wherein it heats the exhaust gas and is thereby cooled. After the one, in particular one heat exchanger, the clean gas is fed to at least one, preferably to at least two, and in particular to at least three heat consumers. In the heat consumers, the energy flow $\dot{E}_{WA}$ is extracted from the clean gas. The energy flow E is the first derivation of E for energy. The basic controlling rule of the energy flow $\dot{E}$ must be calculated with the absolute temperatures. The regulating variables are therefore referred to absolute zero (−273° C.). Therefore, the controlling equation to be established for the first measuring station downstream of the heat exchanger is equation I:

$$\dot{E}_{TNV}[W] + \dot{E}_{AG}[W] = \dot{E}_{WA}[W] + \dot{E}_{RGD}[W] \qquad (I)$$

with:

$\dot{E}_{RGD}$=energy flow of the clean air exhaust via the roof and $\dot{E} = T_{TNV} \times f(\dot{V})$ with $\dot{V}$=volume streams, TNV=thermal post-combustion facility, AG=exhaust gas, WA=heat consumer, RGD=clean air exhaust via the roof.

This way, the following is covered:

"Energy generated by the thermal post-combustion facility+energy contained in the exhaust gas=energy used up in the process+energy discharged over the roof".

Seen from the vantage point of the post-combustion facility, the controlling equation becomes equation II:

$$\dot{E}_{TNV}[W] = \dot{E}_{WA}[W] + \dot{E}_{RGD}[W] - \dot{E}_{AG}[W] \qquad (II)$$

Thereby, the control difference Δ before the control unit is obtained as equation III:

$$\Delta = \{\dot{E}_{WA}[W] + \dot{E}_{RGD}[W] - \dot{E}_{AG}[W]\} - \dot{E}_{TNV}[W] \qquad (III)$$

with $\dot{E}_{WA}$ [W]+$\dot{E}_{RGD}$ [W]−$\dot{E}_{AG}$ [W]=target value and $\dot{E}_{TNV}$ [W]=actual value.

The target value can be defined more precisely:

(i) $\dot{E}_{WA}$ [W] as the heat reduction of the dryer T to be compensated, (ii) $\dot{E}_{AG}$ [W] as the recuperation of heat from the dryer T to be compensated/included, and (iii) $\dot{E}_{RGD}$ [W] as the energy content of the clean gas exhaust over the roof RGD, which is established with the target value $T_{Kamin}$ for calculating the energy content RGD.

The regulating variable is the volume stream $\dot{V}$ at normal conditions (i.N.: Temperature=273.15 K, pressure=1013.25 mbar).

The term $\dot{E}_{RGD}$ [W]−$\dot{E}_{AG}$ [W] also contains the absolute temperature. In order to be able to control energetically optimized, a reference temperature has to be fixed. Customarily, the Celsius scale is used as the reference station. It makes more sense to use as the reference station, the target value over the roof. In this case, term $\dot{E}_{RGD}$ [W] equals zero and disappears. Instead of this, the target value over the roof $\dot{E}_{RGD}$ [W] appears again in the temperature difference. One can also take any temperature as the reference temperature as well as the temperature of the crude gas.

Thereafter, the term $\dot{E}_{AG}$ [W] disappears and the temperature of the crude gas appears again in the term $\dot{E}_{RGD}$ [W] in the temperature difference.

If at least one, in particular one compact, thermal post-combustion facility is used, the at least one, in particular, one combustion chamber and the at least one, in particular, one heat exchanger jointly act as energy supply $\dot{E}_{TNV}$.

The energy output over the at least one, in particular one heat consumer to the at least one, in particular one, drying tunnel can also be calculated by the volume stream of the circulating air. The chimney temperature, i.e., the temperature of the clean gas in the at least one, in particular one, clean gas pipe downstream of the at least one, in particular one heat consumer also appears as a target value in the controlling equation $\dot{E}_{RGD}$.

Therefore, one needs as the measured quantities at least:
  The volume stream in the drying plant or the sum of the partial flows under normal conditions as the adjustable regulating variable,
  the temperature difference in the clean gas for all heat consumers of each single volume stream (cf. FIG. 1, measuring stations 8 and 9),
  the temperature difference over the thermal post-combustion facility, namely the combustion chamber and the heat exchanger (cf. FIG. 1, measuring stations 8 and 1),
  the target value for the control of the combustion chamber temperature (cf. FIG. 1, measuring station 11), and
  the actual value for the control of the exhaust gas or crude gas temperature in the combustion chamber (cf. FIG. 1, measuring station 4).

When the target value is reached during the energy control, namely that the compared amounts of energy are equal and, therefore, the control difference is zero, the target value over the roof is also reached.

In turn, the combustion chamber temperature follows the equation IV:

$$T_{BK}=f(\dot{V}_{variabel}) \quad \text{(IV)}$$

wherein $\dot{V}_{variabel}$=volume stream of the clean gas RG in the clean gas pipe $L_{RG}$ [m³ per hour under normal standard conditions].

Equation IV defines a setting window, wherein the combustion chamber temperature at a minimum volume stream is between 600° C. and 800° C., preferably, between 650° C. and 720° C. and, in particular, between 680° C. to 690° C., and at a maximum volume stream is between 700° C. and 900° C., preferably, between 700° C. and 750° C. and, in particular, between 720° C. and 730° C., whereby, however, both temperature ranges are chosen such that they do not overlap.

Preferably, the volume streams are in a range of from 3000 m³ per hour and 30,000 m³ per hour and, in particular, 4000 m³ per hour and 20,000 m³ per hour (all values under normal standard conditions).

The heat quantity removed in the heat consumers or the clean gas which transports the removed heat quantity at the respective clean gas temperature and clean gas amount serve for heating the at least one, in particular one drying tunnel of the drying plant of the invention, whereby the complete cycle of the variably controlled volume streams is closed. In this case, the amount of energy, which is transported by the exhaust gas stream can cause an energy recovery in drying plants for the cathodic electrodeposition coating which require high temperatures.

Examples of suitable heat consumers are waste heat boilers, recuperators, heat exchangers and gas pipes. A particularly preferred combination of clean gas pipes, circulating gas pipes, circulating gas recuperators and fresh air recuperators which are downstream from a thermal post-combustion facility and pipes for the exhaust gas from the drying tunnel which are upstream from a thermal post-combustion facility are known from the figure of the German patent DE 10 2008 034 746 B4.

The rest of the clean gas is led through at least one, in particular, one additional clean gas pipe through a waste heat boiler if necessary or at least one fresh air recuperator into at least one, in particular one chimney or stack and, from there, released to the atmosphere. By the regulation of the amount of energy which should be released over the roof, the level of the volume streams, i.e, m³ per hour per drying goods such as car bodies can be regulated. The higher the target value is set, the higher is the amount of air per drying good.

The drying plant of the invention and the drying process of the invention are preferably electronically controlled by the at least one, in particular one thermodynamic control of the invention. For the purposes of the thermodynamically controlled process of the invention, the drying plant of the invention comprises
  at least one measuring station for the exhaust gas temperature in the at least one, in particular, one exhaust gas pipe,
  at least one measuring station for the volume stream of the exhaust gas in the at least one, in particular one exhaust gas pipe,
  at least one, in particular one actuator for the at least one, in particular, one blower,
  at least one measuring station for the temperature of the exhaust gas in the at least one, in particular one exhaust gas pipe downstream of the at least one, in particular one heat exchanger,
  at least one, in particular one, control valve in at least one, in particular one cold bypass controllable by at least one, in particular, one control station,
  at least one, in particular one controllable actuator for the at least one, in particular, one control valve in the at least one, in particular, one gas pipe for combustible gases,
  at least one measuring station for the temperature of the clean gas in the at least one, in particular, one clean gas pipe downstream of the at least one, in particular one heat exchanger; this measuring station can be omitted when the at least one, in particular one thermal post-combustion facility comprises at least one, in particular, one deflection chamber,
  at least one measuring station for the temperature of the clean gas in the at least one, in particular one clean gas pipe downstream of the at least one, in particular one heat consumer,
  at least one measuring station for the temperature of the clean gas in the at least one, in particular one clean gas pipe upstream of the at least one, in particular, one heat exchanger, and
  at least one measuring station for the temperature in the at least one, in particular one combustion chamber.

For the thermodynamic control
at least one input of the measured values from at least one of the measuring stations of the temperature of the exhaust in the at least one, in particular one exhaust gas pipe downstream of the at least one, in particular, one heat exchanger,
at least one input of the measured values from at least one of the measuring stations of the exhaust gas temperature in the at least one, in particular one exhaust gas pipe upstream of the at least one, in particular one heat exchanger,
at least one input of the measured values from at least one of the measuring stations of the temperature of the at least one, in particular one combustion chamber,
at least one input of the measured values from at least one of the measuring stations of the temperature of the clean gases in the at least one, in particular one clean gas pipe downstream of the heat consumers,
at least one input of the measured values from at least one of the measuring stations of the volume streams of the clean gases in the at least one in particular, one clean gas pipe downstream of the at least one, in particular one combustion chamber, and
at least one input of the measured values of at least one of the measuring stations of the temperature of the clean gas in the at least one, in particular one clean gas pipe downstream of the at least one, in particular, one heat exchanger
are entered and processed by an algorithm, whereupon
the at least one, in particular, one actuator is controlled by the output of the target values for the combustion chamber temperature,
the at least one, in particular one pilot valve of the at least one, in particular, one cold bypass is controlled by the output of the target values of the exhaust gas temperature upstream of the at least one, in particular one combustion chamber, and
the at least one, in particular, one controllable actuator for the at least one, in particular, one blower is controlled by the output of the target values of the volume streams of the clean gases in the at least one, in particular one clean him gas pipe.

The thermodynamically controlled process of the invention controls the drying plant of the invention so that the volume streams in the drying plant of the invention are always within the range of the threshold values determined by the expert opinion relating to explosion, and that no condensation of gases can occur.

Preferably, the process of the invention for drying of coated drying goods in at least one, in particular one drying plant of the invention is carried out whilst the drying goods are conveyed through at least one, in particular one drying tunnel in conveying direction and are dried thereby whilst
 (i) the volatile organic compounds containing exhaust gases generated thereby are sucked off through at least one, in particular one exhaust gas pipe from the at least one, in particular one drying tunnel,
 (ii) are transported by at least one, in particular, one blower controlled by an actuator to 1, in particular one heat exchanger, whereby the amount of the sucked off exhaust gases is controlled,
 (iii) are, at least temporarily, heated in at least one, in particular one heat exchanger by the clean gas from the at least one, in particular, one thermal post-combustion chamber facility in which at least one, in particular, one clean gas pipe is heated to exhaust gas temperatures,
 (iv) are transported through at least one, in particular one cold bypass circumventing the at least one, in particular one heat exchanger and connecting the at least one, in particular one exhaust gas pipe upstream and downstream of the at least one, in particular one heat exchanger, the cold bypass being regulated by at least one, in particular one pilot valve controlled by at least one, in particular one control station, which control valve remains temporarily open or closed or remains partially or completely open or closed during the complete drying process, whereby the exhaust gas temperature is kept constant or is varied if necessary,
 (v) are transported through at least one, in particular, one additional exhaust gas pipe from the at least one, in particular one heat exchanger to the at least one, in particular one burner and
 (vi) are mixed with the fuel which is supplied by at least one, in particular one fuel pipe in varying amounts, and
 (vii) are burned in the at least one, in particular, one burner in the at least one, in particular one combustion chamber of the at least one, in particular one thermal post-combustion facility in at least one flame, in particular in at least two or more flames at variable combustion chamber temperatures, whereby
 (vii) the resulting clean gas RG having variable temperature is transported out of the at least one, in particular one combustion chamber through at least one, in particular one clean gas pipe to the at least one, in particular one heat exchanger wherein it variably heats the sucked off exhaust gases at least temporarily,
 (ix) the clean gas exiting the at least one, in particular one heat exchanger is transported to at least one, preferably, to at least two, and, in particular to at least three heat consumers wherein varying amounts of heat are taken from the clean gas, which amounts are used, to varying heatingly of the at least one, in particular one drying tunnel, whereupon
 (x) the clean gas is released over the roof into the atmosphere.

Preferably, the clean gas is released into the atmosphere either directly or through at least one chimney or at least one, in particular one waste heat boiler upstream from the chimney. If necessary, fresh air can be supplied in order to cool the clean gas further to a harmless temperature.

The drying plant of the invention, the drying process of the invention and the thermodynamically controlled regulatory process of the invention shows numerous advantages.

Thus, the complete drying plant of the invention is calculated and controlled with standard volume streams so that at any arbitrary location the varying volume streams and the energy requirements can be determined independent of pressure and temperature.

Reliable and tested measuring systems, as for example, the Venturi measurements and temperature sensors such as PT 100 can be used so that the operational safety is guaranteed and the availability of the complete plant survives.

A substitute control station can be added which ensures the emergency operation of the drying plants of the invention when additional measuring units fail. The values to be set can be gleaned from the ongoing operation.

By the use of the reserve design and/or by the enlargement of the heat exchangers the required process parameters can be maintained at all operating conditions and at all locations of the drying plant of the invention.

By dynamizing the combustion chamber temperature in dependency of the volume stream, the emission values of noxious substances can be kept constant by the drying process of the invention and the regulatory process of the invention and can be set at a low value.

Furthermore, the spreading of the controllable volume streams by the drying process of the invention and the thermodynamic regulatory process of the invention can be widened. This way, the controllable power output of the thermal post-combustion facility can be significantly enhanced.

In the case of the compact thermal post-combustion facilities a higher volume stream is led through the cooling shell by controlling the exhaust gas temperature upstream from the combustion chamber at a minimum volume stream due to which the thermal combustion chamber is at its hottest temperature, whereby the skin of the combustion chamber is cooled exactly when it's necessary.

The dynamization or variation of the combustion chamber temperatures cause an automatic transition into the intermitting operation. The transition into the intermitting operation needs not switched on any longer. This way, no overheating of the drying plant of the invention occurs during the idle mode and the operation of the drying plant is independent of incidences in the coating cabins.

The mode of operation with adjusted optimal volume streams lowers the consumption of the electrical energy of the exhaust gas blowers. Moreover, energy consuming throttle valves or measures increasing the pressure loss are no longer necessary.

The possibility for the simple adjustment of the volume streams per drying good opens up the opportunity of optimizing the consumption of energy on the one hand and the cleaning efforts due to condensate on the other hand.

In total, significant energy savings can be achieved as compared with customary drying plants so that one can react particularly flexibly to rising energy prices.

SHORT DESCRIPTION OF THE FIGURES

Figure 2:
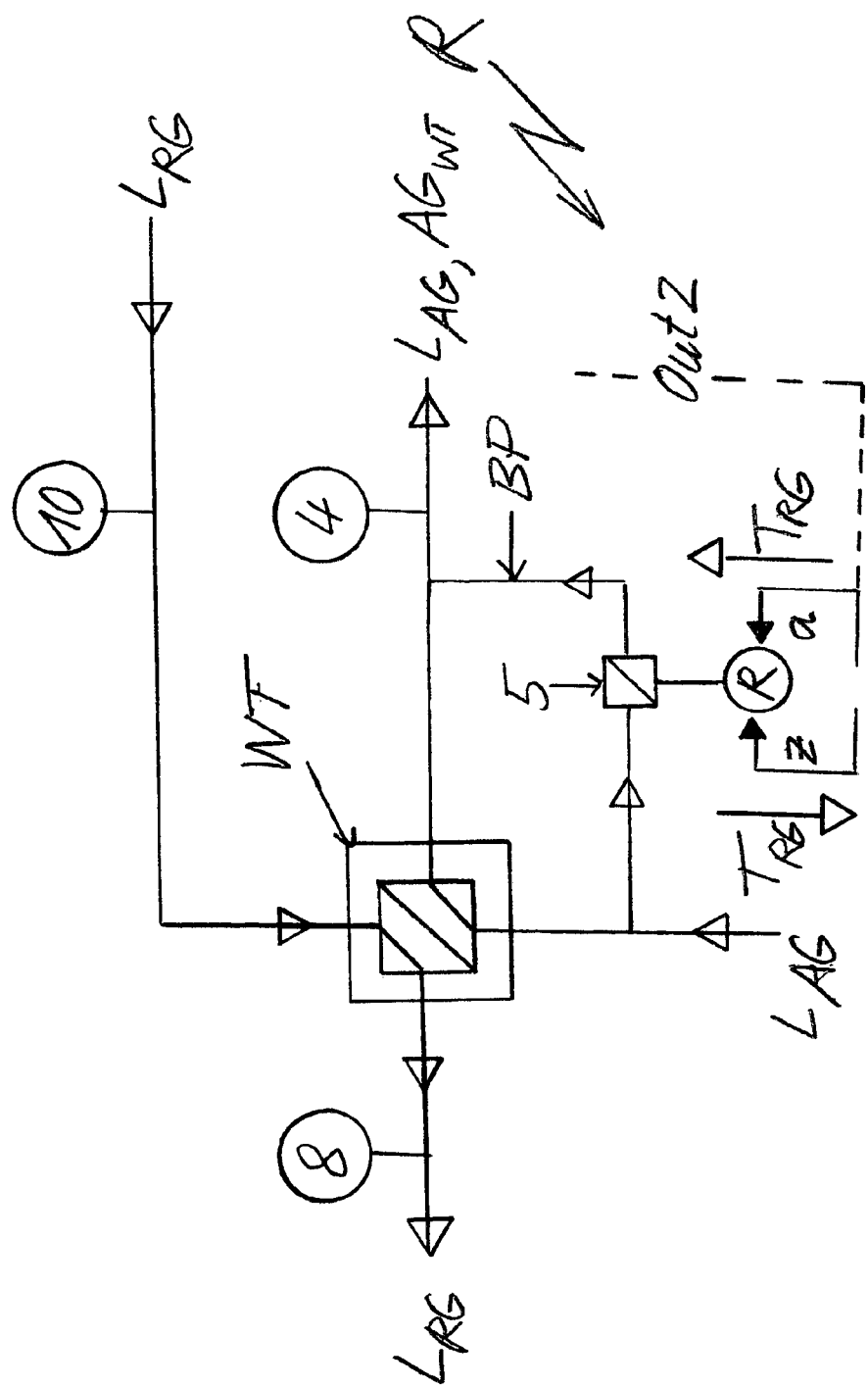
Figure 3:
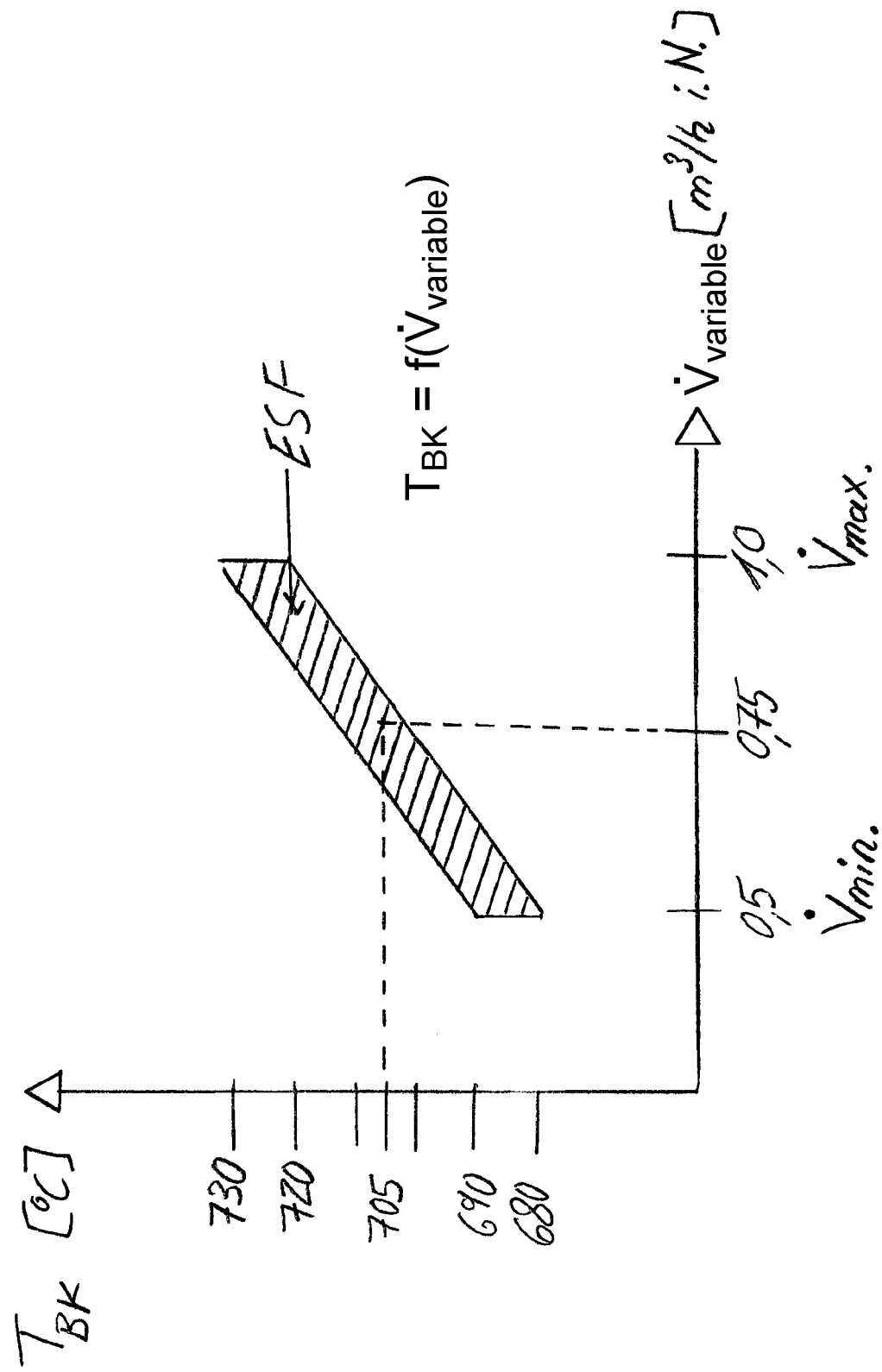

The drying plant of the invention and the process of the invention are explained in detail by the Examples with reference to the FIGS. 1 to 3. The FIGS. 1 to 3 serve to illustrate the principles and the functions of the drying plant of the invention and of the drying process of the invention and, therefore, need not be drawn true to scale.

FIG. 1 shows the flowchart of a thermodynamically controlled drying plant T of the invention for drying of coated drying goods TG, FIG. 2 shows the detailed flowchart of the control R of the cold bypass BP of FIG. 1, and FIG. 3 shows the emission setting window EST=combustion chamber temperature $T_{BK}$ [° C.] as a function of the volume stream $\dot{V}_{variable}$ [m³ per hour under standard conditions] of the clean gas RG in the clean gas pipe $L_{RG}$.

In the FIGS. 1 to 3, the reference signs have the following meaning:

1 Measuring station for the exhaust gas temperature $T_{AG}$ [° C.] in the exhaust gas pipe $L_{AG}$
2 Measuring station for the volume stream $\dot{V}$ [m³/hour under standard conditions] off the exhaust gas AG in the exhaust gas pipe $L_{AG}$
3 Actuator for the blower GBL
4 Measuring station $T_{WT}$ [° C.] off the exhaust gas $AG_{WT}$ upstream off the combustion chamber BK
5 Control valve in the cold bypass BP, regulated by the control R
6 Actuator for the valve 7 in the natural gas pipe $L_{EG}$
7 Pilot valve for the natural gas EG
8 Measuring station for the temperature $T_{NWA}$ [° C.] of the clean gas RG in the clean gas pipe $L_{RG}$ downstream of the heat exchanger WT and upstream of the consumer WA
9 Measuring station for the temperature $T_{Kamin}$ of the clean gas RG in the clean gas pipe $L_{RG}$ downstream of the heat consumer WA
10 Measuring station for the temperature $T_{BK}$ [° C.] of the clean gas RG in the clean gas pipe $L_{RG}$ upstream of the heat exchanger WT
11 Measuring station for the temperature $T_{BK}$ [° C.] of the clean gas RG in the combustion chamber BK
a Position "open"
AG Exhaust gas from the drying tunnel TT
$AG_{WT}$ Exhaust gas in the exhaust gas pipe $L_{AG}$ downstream of the heat exchanger WT
BK Combustion chamber
BP Cold bypass
BR Burner
$\dot{E}_{AG}$ Energy flow exhaust gas [W]
$\dot{E}_{RGD}$ Energy flow clean gas over the roof [W]
$\dot{E}_{TNV}$ Energy flow thermal post-combustion facility [W]
$\dot{E}_{WA}$ Energy flow heat consumer [W]
EG Fuel
ESF Emission setting window
FL Flame
FU Frequency converter
GBL Blower or exhaust gas ventilator
$HZ_{TT}$ Heater of the drying tunnel TT by the heat consumer(s) WA
in1 Input of the measured values of the temperature $T_{WT}$ of the exhaust gases $AG_{WT}$ in the exhaust gas pipe $L_{AG}$ WT (measuring station 4)
in2 Input of the measured values $T_{AG}$ of the temperature [° C.] of the exhaust gases AG in $L_{AG}$ upstream of WT (measuring station 1)
in3 Input of the measured values of the combustion chamber temperature $T_{BK}$ [° C.] (measuring station 11)
in4 Input of the measured values of the temperature $T_{Kamin}$ [° C.] (measuring station 9)
in5 Input of the measured values of the volume stream $\dot{V}$ variabel [m³/hour under standard conditions] off AG in $L_{AG}$ (measuring station 2)
in6 Input of the measured values of the temperature $T_R$ [° C.] of the clean gas RG in the clean gas pipe $L_{RG}$ downstream of the heat exchanger WT (measuring station 8)
i. N. Standard conditions: temperature=273.15 K, pressure=1013.25 mbar
K Chimney
$L_{AG}$ Pipe for the exhaust gas AG
$L_{EG}$ Pipe for the fuel EG
$L_{RG}$ Pipe for the clean gas RG
LTG Coated drying goods
out1 Output of target volumes for $T_{BK}$ [° C.] for controlling of the actuator 6
out2 Output of the target values $T_{WT}$ [° C.] to the control station R
out3 Output of the target values for the volume stream $\dot{V}_{variabel}$ [m³/hour under standard conditions] of the exhaust gas AG in the exhaust gas pipe $L_{AG}$ to the actuator 3
R Control station in the cold bypass BP
RGD Clean gas over the roof
SK Skid
T Drying plant
$T_{AG}$ Exhaust gas temperature [° C.] (measuring station 1)

$T_{Kamin}$ Temperature [° C.] of the clean gas RG in in the clean gas pipe $L_{RG}$ downstream of the heat consumer WA (measuring stations 9)

$T_{BK}$ Temperature [° C.] of the combustion chamber BK (measuring station 11)

$T_{NWA}$ Temperature [° C.] of the clean gas RG in the clean gas pipe $L_{RG}$ downstream of the heat exchanger WT and upstream of the heat consumer WA (measuring station 8)

$T_{RG}$ Temperature [° C.] of the clean gas RG in the clean gas pipe $L_{RG}$ downstream of the combustion chamber BK [° C.] (measuring station 10)

$T_{WT}$ Temperature of the exhaust gas $AG_{WT}$ in the exhaust gas pipe $L_{AG}$ downstream of the heat exchanger WT [° C.] (measuring station 4)

TDR Thermodynamic control

TNV Thermal post-combustion

TT Drying tunnel $\dot{V}$ Volume stream [m³/hour under standard conditions]

$\dot{V}_{variabel}$ Volume stream of the clean gas RG in the clean gas pipe $L_{RG}$ [m³/hour under standard conditions]

$\dot{V}_{min.}$ Minimum volume stream of the clean gas RG in the clean gas pipe $L_{RG}$ [m³/hour under standard conditions]

$\dot{V}_{max.}$ Maximum volume stream of the clean gas RG in the clean gas pipe $L_{RG}$ [m³/hour under standard conditions]

VFR Traverse or conveying direction

VOC Volatile Organic Compounds

W Power in Watt

WA Heat consumer z Position "closed"

↑$T_{RG}$ Temperature of the clean gas RG (measuring station 8) rises

↓$T_{RG}$ Temperature of the clean gas RG (measuring station 8) decreases

DETAILED DESCRIPTION OF THE FIGURES

FIGS. 1 to 3

The drying plant of the invention T was designed for minimum volume streams $\dot{V}_{min.}$ of 5,000 m³/hour and for maximum volume streams $\dot{V}_{max.}$ of 10,000 m³/hour. The emission setting window ESF was predetermined by corner points of 680° C. and 690° C. as well as 720° C. and 730° C. Plant components which were particularly thermally stressed were built mainly with stainless steel. Plant components which were less thermally stressed were built mainly with shock resistant and thermally stable plastics made flame retardant, if necessary. The drying plant T was electronically controlled by a thermodynamic control. The drying plant T was subject to an expert opinion relating to explosion.

The drying plant T of the invention for drying of coated drying goods LTG, in particular, car bodies, comprised
- a drying tunnel TT through which the car bodies LTG were conveyed in the conveying direction VFR on skids SK,
- a pipe $L_{AG}$ for the exhaust gas AG containing volatile organic compounds VOC from the drying tunnel TT,
- a blower GBL controlled by an actuator 3 for the controlled transfer of the exhaust gas AG to a heat exchanger WT,
- a heat exchanger WT, wherein the exhaust gas AG was variably heated by the clean gas RG in the clean gas pipe $L_{RG}$,
- an exhaust gas pipe $L_{AG}$ downstream from the heat exchanger WT, through which the exhaust gas AGWT which was heated to variable temperatures TAG, was transported to the burner BR in variable amounts,
- a cold bypass BP circumventing the heat exchanger WT and connecting the exhaust gas pipe $L_{AG}$ upstream of the heat exchanger WT with the exhaust gas pipe $L_{AG}$ downstream of the heat exchanger WT, which cold bypass BP was controlled by an electronically regulated control unit R,
- a fuel pipe through which the fuel EG, in the present case, natural gas EG, was transported in a controlled way to the burner BR,
- a burner BR in the combustion chamber BK of the thermal post-combustion facility TNV,
- a clean gas pipe $L_{RG}$, through which the clean gas RG having variable temperatures $T_{BK}$ is transported from the combustion chamber BK to the heat exchanger WT, where it was variably cooled down by the exhaust gas AG,
- a clean gas pipe $L_{RG}$ through which the variably cooled clean gas RG was led to a heat consumer WA,
- a heater $HZ_{TT}$ which heated the drying tunnel variably by the heat consumer WA, and
- a clean gas pipe $L_{RG}$, through which the clean gas RG, which was further cooled down, is led to a chimney K, from where the clean gas RG is released over the roof into the atmosphere.

For the purposes of the electronic control, the drying plant T of the invention contained
- a measuring station 1 for the temperature $T_{AG}$ [° C.] of the exhaust gas AG,
- a measuring station 2 for the volume stream $\dot{V}$ of the exhaust gas AG in the at least one exhaust gas pipe $L_{AG}$,
- a controllable actuator 3 for the blower GBL,
- a measuring station 4 for the temperature $T_{WT}$ of the exhaust gas $AG_{TW}$ in the exhaust gas pipe $L_{AG}$ downstream of the heat exchanger WT and upstream of the burning chamber BK,
- a pilot valve 5 in the cold bypass BP which is controlled by a control unit R,
- a controllable actuator 6 for the control valve 7 in the fuel pipe $L_{EG}$,
- a pilot valve 7 for the fuel EG, in the present case, natural gas EG,
- a measuring station 8 for the temperature $T_{RG}$ of the clean gas RG in the clean gas pipe him downstream of the heat exchanger WT,
- a measuring station 9 for the temperature $T_{Kamin}$ of the clean gas RGD in the clean gas pipe $L_{RG}$ downstream of the at least one heat consumer WA,
- a measuring station 10 for the temperature $T_{RG}$ of the clean gas RG in the clean gas pipe $L_{RG}$ upstream from the heat exchanger WT, and
- a measuring station 11 for the temperature $T_{BK}$ in the combustion chamber BK.

As the measuring instruments, customary and known instruments for measurements at high temperatures and hot gas streams are used.

For purposes of the electronic control of the drying plant T, the thermodynamic control unit TDR received
- an input in1 of the measured values of the temperature $T_{WT}$ of the exhaust gas $AG_{WT}$ in the exhaust gas pipe $L_{AG}$ downstream of the heat exchanger WT from the measuring station 4,
- an input in2 of the measured values of the temperature $T_{AG}$ [° C.] of the exhaust gas AG from the measuring station 1, an input in3 for the measured values of the combustion chamber temperature $T_{BK}$ from the measuring station 11, an input in4 for the measured values of the temperature $T_{Kamin}$ from the measuring station 9, an input in5 for the measured values of the volume stream $\dot{V}_{variabel}$ of the clean gas RG in the clean gas pipe L RG from the measuring station 2, an input in6 of the target values of the temperature $T_{RG}$ of the team gas. RG in the clean gas pipe $L_{RG}$ downstream of the heat exchanger WT from the measuring station 8.

For the purposes of control, the thermodynamic measuring station TDR put out after the calculation an output out1 of the target values for TBK to the actuator 6, an output out2 of the target values TWT to the control unit R, and an output out3 of the target values of the volume streams $\dot{V}_{variabel}$ [m³/hour under standard conditions].

The controlling algorithm was based on the following mathematical correlations:

The controlling equation for the measuring station 8 downstream of the heat exchanger WT was equation I:

$$\dot{E}_{TNV}[W] + \dot{E}_{AG}[W] = \dot{E}_{WA}[W] + \dot{E}_{RGD}[W] \qquad (I).$$

Seen from the vantage station of the post-combustion facility, the controlling equation became equation II:

$$\dot{E}_{TNV}[W] = \dot{E}_{WA}[W] + \dot{E}_{RGD}[W] - \dot{E}_{AG}[W] \qquad (II)$$

Thereby, the control difference Δ upstream of the control unit was obtained as equation III:

$$\Delta = \{\dot{E}_{WA}[W] + \dot{E}_{RGD}[W] - \dot{E}_{AG}[W]\} - \dot{E}_{TNV}[W] \qquad (III)$$

with $\dot{E}_{WA}$ [W] + $\dot{E}_{RGD}$ [W] – $\dot{E}_{AG}$ [W]=target value and $\dot{E}_{TNV}$ [W]=actual value.

The target value could be defined more precisely:
(i) $\dot{E}_{WA}$ [W] as the heat reduction of the dryer T to be compensated,
(ii) $\dot{E}_{AG}$ [W] as the recuperation of heat from the dryer T to be compensated/included and
(iii) $\dot{E}_{RGD}$ [W] as the energy content of the clean gas exhaust over the roof RGD, which is established with the target value $T_{Kamin}$ for calculating the energy content RGD.

The regulating variable is the volume stream $\dot{V}$ at normal or standard conditions (i.N.: Temperature=273.15 K, pressure=1013.25 mbar).

The combustion chamber temperature TBK followed in turn, the equation IV:

$$T_{BK} = f(\dot{V}_{variabel}) \qquad (IV),$$

wherein $\dot{V}_{variabel}$=volume stream of the clean gas RG in the clean gas pipe $L_{RG}$ [m³ per hour under normal standard conditions].

For the heater $HZ_{TT}$ of the drying zone TT, the thermal power $\dot{E}_{WA}$ [W] was taken from the heat consumers WA.

The drying plant T of the invention could be combined, for example, with the configuration described in detail in the Figure of the German patent DE 10 2008 034 746 B4. The following reference signs in italic refer to the known Figure. In the drying plant, the clean gas exited the thermal post-combustion facility TNV 9 by the clean gas pipe 24, 24a, 24b and 24c. The three last mentioned sections were laid section by section at the floor of the drying tunnel so that the drying goods could be particularly well heated from below. The clean gas pipes exited the floor of the drying tunnel and the clean gas contained therein heated the circulating gas in the circulating gas recuperators 10 and 12, which circulating gas was fed to them by the circulating gas pipes 17 from the drying tunnel and was then led back into the drying tunnel. The clean gas which was cooled down was further cooled in the fresh air recuperator 14 before the discharge into the atmosphere, and the fresh air heated in this way was again led back into the drying facility via the fresh air pipes 15a and 15b.

This way, not only the significant advantages of the drying plant T of the invention could be combined with the advantages of the drying plant according to the German patent DE 10 2008 034 746 B4 thus resulting in new particular advantages, but significant energy savings and a significant reduction of the emissions of NOx, complete carbon, carbon monoxide and formaldehyde could be achieved. When using a combustion with oil, sulfur dioxide was also observed.

With the combination of the drying plant T of the invention with a compact thermal post-combustion facility TNV of Wenker GmbH & Co. KG, Ahaus, Germany, the thermal post-combustion facility TNV could be run with significant more stable emissions, and the controllable performance range of the TNV could be considerably extended when one held the exhaust gas temperature $T_{WT}$ upstream from the combustion chamber BK constant with the help of the control station R of the cold bypass BP and changed the combustion chamber temperature. TBK dependent on the volume stream $\dot{V}_{min.}$ to $\dot{V}_{max.}$ within the limits "Minimum combustion chamber temperature TBK to maximum combustion chamber temperature TBK".

The possibility of circumventing the intermission set up moreover enabled the drying plant T of the invention to let drying goods LTG, in particular, car bodies, enter at low combustion chamber temperatures $T_{BK}$. Therefore, the minimum amount of air could be used maximally in order to dry the car bodies, which was not possible in the prior art drying processes, in particular, during the usage of the intermission set up.

We claim:

1. A thermodynamically controllable drying plant for drying of drying goods, comprising:
   at least one drying tunnel through which drying goods can be conveyed in a conveying direction;
   at least one heat exchanger;
   at least one blower controlled by a frequency converter for controlled transport of exhaust gas from the at least one drying tunnel to the at least one heat exchanger;
   at least one exhaust gas pipe downstream of the at least one heat exchanger through which the exhaust gas is transportable in varying amounts to at least one burner in at least one combustion chamber of at least one thermal post-combustion facility, the at least one exhaust gas pipe containing volatile organic compounds out of the at least one drying tunnel;
   at least one cold bypass circumventing the at least one heat exchanger and connecting the at least one exhaust gas pipe upstream of the at least one heat exchanger with the at least one exhaust gas pipe downstream of the at least one heat exchanger, wherein the at least one cold bypass is controllable with at least one electronically regulated control station;
   at least one fuel pipe through which fuel is controllably transportable to the at the least one burner;
   at least one clean gas pipe through which clean gas is transportable from the at least one combustion chamber to the at least one heat exchanger, the clean gas having variable temperatures, wherein the exhaust gas is variably heated by the clean gas at the least one heat exchanger, wherein the at least one clean gas pipe transports variably cooled clean gas from the at least one heat exchanger to at least one heat consumer (WA), and wherein the at least one clean gas pipe transports the variably cooled clean gas to at least one chimney, where the variably cooled clean gas is releasable into atmosphere as clean gas exhaust;

at least one heater by which the at least one drying zone is heatable by the at least one heat consumer;

at least one thermodynamic control unit having an algorithm based on;

Equation I: Control Equation for a measuring station downstream of the heat exchanger:

$$\dot{E}_{TNV}[W]+\dot{E}_{AG}[W]=\dot{E}_{WA}[W]+\dot{E}_{RGD}[W];$$

Equation II: Control Equation relative to a vantage point of the at least one thermal post-combustion facility:

$$\dot{E}_{TNV}[W]=\dot{E}_{WA}[W]+\dot{E}_{RGD}[W]-\dot{E}_{AG}[W];$$

Equation III: control difference Δ upstream of the control unit:

$$\Delta=\{\dot{E}_{WA}[W]+\dot{E}_{RGD}[W]-\dot{E}_{AG}[W]\}-\dot{E}_{TNV}[W];$$

with $\dot{E}_{WA}$ [W] $\dot{E}_{RGD}$ [W]-$\dot{E}_{AG}$ [W]=target value and $\dot{E}_{TNV}$ [W]=actual value, wherein the target value is defined as follows:

(i) $\dot{E}_{WA}$ [W] as a heat reduction of the drying plant to be compensated, (ii) $\dot{E}_{AG}$ [W] as a recuperation of heat from the drying plant to be compensated/included, and (iii) $\dot{E}_{RGD}$ [W] as an energy content of the clean gas exhaust;

Regulating Variable: a volume stream $\dot{V}$ at normal or standard conditions (temperature=273.15 K, pressure=1013.25 mbar); and Equation IV: a combustion chamber temperature:

$$T_{BK}=f(\dot{V}_{variabel}),$$

wherein $\dot{V}_{variabel}$=volume stream of the clean gas in the at least one clean gas pipe.

2. The thermodynamically controllable drying plant as claimed in claim 1, further comprising:

at least one first measuring station for a temperature of the exhaust gas;

at least one second measuring station for a volume stream of the exhaust gas in the at least one exhaust gas pipe;

at least one first controllable actuator for the at least one blower;

at least one third measuring station for a temperature of the exhaust gas in the exhaust gas pipe downstream of the at least one heat exchanger and upstream of the at least one combustion chamber;

at least one pilot valve in the at least one cold bypass which is controlled by the at least one electronically regulated control station;

at least one control valve in the at least one fuel pipe for controlling flow of the fuel;

at least one second controllable actuator for the at least one control valve in the at least one fuel pipe;

at least one fourth measuring station for a temperature of the clean gas in the at least one clean gas pipe downstream of the at least one heat exchanger;

at least one fifth measuring station for a temperature of the clean gas in the at least one clean gas pipe downstream of the at least one heat consumer;

at least one sixth measuring station for a temperature of the clean gas in the at least one clean gas pipe upstream from the at least one heat exchanger; and at least one seventh measuring station for a temperature in the at least one combustion chamber of the at least one post-combustion facility.

3. The thermodynamically controllable drying plant as claimed in claim 1, wherein the at least one heat consumer acts as the at least one heater for the at least one drying tunnel.

4. The thermodynamically controllable drying plant as claimed in claim 2, being controllable with at least one thermodynamic control station.

5. The thermodynamically controllable drying plant as claimed in claim 4, wherein the at least one thermodynamic control station comprises:

at least one first input of the measured values of the temperature of the exhaust gas in the at least one exhaust gas pipe downstream of the at least one heat exchanger from the third measuring station;

at least one second input of the measured values of the temperature of the exhaust gas from the first measuring station;

at least one third input for the measured values of the combustion chamber temperature from the seventh measuring station;

at least one fourth input for the measured values of the temperature from the fifth measuring station;

at least one fifth input for the measured values of the volume stream of the clean gas in the at least one clean gas pipe from the second measuring station;

at least one sixth input of target values of the temperature of the clean gas in the at least one clean gas pipe downstream of the at least one heat exchanger from the fourth measuring station;

at least one first output of target values to the at least one second controllable actuator;

at least one second output of target values to the at least one electronically regulated control station; and at least one third output of target values to the at least one first controllable actuator for the at least one blower.

6. The thermodynamically controlled drying plant as claimed in claim 1, wherein the at least one heat consumer is selected from the group consisting of waste heat boilers, recuperators, heat exchangers and gas pipes.

7. The thermodynamically controlled drying plant as claimed in claim 1, wherein the drying goods are formed plastic parts, which are dissolved and/or melted at their surface, glued composites of all kinds, the adhesive layers of which are not yet dried, and formed objects coated by spray coating, powder coating, curtain coating, electrodeposition coatings and doctor blade coating, and formed objects of all kind printed or painted by sieve printing, intaglio printing, offset printing, relief printing, and flexographic printing.

8. The thermodynamically controllable drying plant as claimed in claim 7, wherein the drying goods (LTG) are building parts for architectural purposes, such as window frames, grids, railings, doors, stairs, rod assemblies, tubes, and mobile buildings; building parts and chassis of means of locomotion such as automobiles, trucks, buses, building machines, motorcycles, mopeds, quads, scooters, pedal-scooters, hoover boards, skateboards, longboards, two-wheel wind runners, locomotives, train wagons, airplane parts, hulls; high-quality household appliances; heating elements; radiators and building parts for sanitary purposes.

9. A process for drying of drying goods in at least one thermodynamically controllable drying plant, wherein the drying goods are conveyed through at least one drying tunnel in a conveying direction and thereby dried, comprising:

exhaust gases containing volatile organic compounds are sucked off through at least one exhaust gas pipe from the at least one drying tunnel;

the exhaust gases are transported by at least one blower controlled by a frequency converter to at least one heat exchanger, whereby an amount of the sucked off exhaust gases is controlled;

the exhaust gases are, at least temporarily, heated to variable exhaust gas temperatures in the at least one heat exchanger by clean gas in at least one clean gas pipe upstream of at least one thermal post-combustion chamber facility;

the exhaust gases are transported through at least one cold bypass circumventing the at least one heat exchanger and connecting the at least one exhaust gas pipe upstream and downstream of the at least one heat exchanger, the at least one cold bypass being regulated by at least one pilot valve controlled by at least one control station, wherein the pilot valve remains temporarily open or closed or remains partially or completely open or closed during a complete drying process, wherein a temperature of exhaust gas is kept constant or is varied;

the exhaust gases are transported through the at least one exhaust gas pipe from the at least one heat exchanger to at least one burner;

the exhaust gases are mixed in varying amounts with fuel which is supplied by at least one fuel pipe;

the exhaust gases are burned in the at least one burner in at least one combustion chamber of at least one thermal post-combustion facility in at least one flame at variable combustion chamber temperatures;

the clean gas having variable temperatures is transported out of the at least one combustion chamber through the at least one clean gas pipe to the at least one heat exchanger, wherein the clean gas variably heats the sucked off exhaust gases at least temporarily;

the clean gas exiting the at least one heat exchanger is transported to at least one heat consumer, wherein a varying amount of heat is taken from the clean gas, which amount is used for varyingly heating of the at least one drying tunnel; and the clean gas is released into atmosphere as clean gas exhaust, wherein an algorithm of at least one thermodynamic control unit is based on:

Equation I: Control Equation for a measuring station downstream of the heat exchanger:

$$\dot{E}_{TNV}[W] + \dot{E}_{AG}[W] = \dot{E}_{WA}[W] + \dot{E}_{RGD}[W];$$

Equation II: Control Equation relative to a vantage point of the at least one thermal post-combustion facility:

$$\dot{E}_{TNV}[W] = \dot{E}_{WA}[W] + \dot{E}_{RGD}[W] - \dot{E}_{AG}[W];$$

Equation III: control difference Δ upstream of the control unit:

$$\Delta = \{\dot{E}_{WA}[W] + \dot{E}_{RGD}[W] - \dot{E}_{AG}[W]\} - \dot{E}_{TNV}[W];$$

with $\dot{E}_{WA}$ [W]+$\dot{E}_{RGD}$ [W]−$\dot{E}_{AG}$ [W]=target value and $\dot{E}_{TNV}$ [W]=actual value, wherein the target value is defined as follows:

(i) $\dot{E}_{WA}$ [W] as a heat reduction of the drying plant to be compensated, (ii) $\dot{E}_{AG}$ [W] as a recuperation of heat from the drying plant to be compensated/included, and (iii) $\dot{E}_{RGD}$ [W] as an energy content of the clean gas exhaust;

Regulating Variable: a volume stream $\dot{V}$ at normal or standard conditions (temperature=273.15 K, pressure=1013.25 mbar); and Equation IV: a combustion chamber temperature:

$$T_{BK} = f(\dot{V}_{variabel}),$$

wherein $\dot{V}_{variabel}$=volume stream of the clean gas in the at least one clean gas pipe.

10. The process as claimed in claim 9, wherein the clean gas released into the atmosphere is either released directly, through a chimney or from a downstream waste heat boiler.

11. The process as claimed in claim 9, wherein Equation IV defines a setting window, wherein the combustion chamber temperature at a minimum volume stream is between 600° C. and 800° C., and at a maximum volume stream is between 700° C. and 900° C., and wherein both temperature ranges are chosen such that they do not overlap.

12. The process as claimed in claim 11, wherein the volume streams are in the range of from 3000 m³ per hour to 30.000 m³ per hour under normal standard conditions.

13. The process as claimed in claim 9, wherein the following inputs are entered into the at least one thermodynamic control unit:

at least one first input of measured values of a temperature of the exhaust gases in the at least one exhaust gas pipe downstream from the at least one heat exchanger and the at least one cold bypass from at least one first measuring station;

at least one second input of measured values of a temperature of the exhaust gas from at least one second measuring station;

at least one third input of measured values of at least one combustion chamber temperature from at least one third measuring station;

at least one fourth input of measured values of a temperature from at least one fourth measuring station;

at least one fifth input of measured values of volume streams of the clean gas in the at least one clean gas pipe from at least one sixth measuring station; and at least one sixth input of measured values of a temperature of the clean gas in the at least one clean gas pipe downstream from the at least one heat exchanger, wherein at least one first actuator is controlled by at least one first output of the target values from the at least one thermodynamic control unit for the at least one combustion chamber temperature;

wherein the at least one control station is controlled by at least one second output of target values from the at least one thermodynamic control unit for exhaust gas in the at least one cold bypass; and wherein at least one second actuator is controlled by at least one third output of target values from the at least one thermodynamic control unit for at least one blower connected to the at least one exhaust gas pipe from the at least one drying tunnel.

14. The process as claimed in claim 9, wherein two or more drying plants are linked with one thermal post-combustion facility, wherein the energy content of the clean gas exhaust is controlled at the fourth measuring station by the specification of a target value for a temperature of the clean gas in the at least one clean gas pipe downstream of the at least one heat consumer.

* * * * *